(12) United States Patent
Dunton (10) Patent No.: US 8,762,869 B2
(45) Date of Patent: Jun. 24, 2014

(54) REDUCED COMPLEXITY USER INTERFACE

(75) Inventor: Randy R. Dunton, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 869 days.

(21) Appl. No.: 12/343,062

(22) Filed: Dec. 23, 2008

(65) Prior Publication Data

US 2010/0162176 A1   Jun. 24, 2010

(51) Int. Cl.
*G06F 3/048* (2013.01)

(52) U.S. Cl.
USPC .......................................... 715/769; 715/810

(58) Field of Classification Search
USPC ................... 715/764, 861, 862, 821
See application file for complete search history.

(56) References Cited

U.S. PATENT DOCUMENTS

| | | | | |
|---|---|---|---|---|
| 5,471,578 A * | 11/1995 | Moran et al. | | 715/863 |
| 5,528,260 A * | 6/1996 | Kent | | 345/684 |
| 5,689,667 A * | 11/1997 | Kurtenbach | | 715/810 |
| 5,914,715 A * | 6/1999 | Sasaki | | 715/803 |
| 6,377,284 B1 * | 4/2002 | Lentz et al. | | 715/764 |
| 6,545,669 B1 * | 4/2003 | Kinawi et al. | | 345/173 |
| 6,781,609 B1 * | 8/2004 | Barker et al. | | 715/760 |
| 6,909,439 B1 * | 6/2005 | Amro et al. | | 345/660 |
| 7,536,650 B1 * | 5/2009 | Robertson et al. | | 715/767 |
| 7,761,801 B2 * | 7/2010 | Park | | 715/764 |
| 7,890,890 B2 * | 2/2011 | Jarrett et al. | | 715/863 |
| 8,112,715 B2 * | 2/2012 | Cragun et al. | | 715/745 |
| 2002/0089541 A1 * | 7/2002 | Orbanes et al. | | 345/764 |
| 2004/0080532 A1 * | 4/2004 | Cragun et al. | | 345/745 |
| 2006/0112347 A1 * | 5/2006 | Baudisch | | 715/764 |
| 2007/0150834 A1 * | 6/2007 | Muller et al. | | 715/810 |
| 2008/0178115 A1 * | 7/2008 | Yokota | | 715/784 |
| 2008/0229222 A1 * | 9/2008 | Kake | | 715/764 |
| 2008/0229223 A1 * | 9/2008 | Kake | | 715/764 |
| 2008/0307334 A1 * | 12/2008 | Chaudhri et al. | | 715/764 |
| 2008/0307335 A1 * | 12/2008 | Chaudhri et al. | | 715/764 |
| 2008/0313674 A1 * | 12/2008 | Dunton et al. | | 725/43 |
| 2008/0313675 A1 * | 12/2008 | Dunton | | 725/46 |
| 2009/0327977 A1 * | 12/2009 | Bachfischer et al. | | 715/863 |
| 2011/0109628 A1 * | 5/2011 | Rurin | | 345/420 |

FOREIGN PATENT DOCUMENTS

WO   WO 2007121557 A1 * 11/2007

OTHER PUBLICATIONS

Agarawala, et al., Keepin' It Real: Pushing the Desktop Metaphor with Physics, Piles and the Pen, CHI 2006, Apr. 22-27, 2006, Montreal, Quebec, Canada, 10 pages.*

* cited by examiner

*Primary Examiner* — Amy Ng
*Assistant Examiner* — William Titcomb
(74) *Attorney, Agent, or Firm* — Garrett IP, LLC (57) ABSTRACT

A reduced complexity user interface is described. In an embodiment, a user interface module causes an animation of a pile of objects on a user interface display. The pile of objects is configured to expand from a contracted form when a pointer approaches a boundary of the pile on the user interface display. The user interface module is configured to determine two closest objects in the pile of objects that correspond with the pointer on the user interface display and to move the two closest objects to the pointer to visually indicate an insertion point into the pile. Other embodiments are described and claimed.

20 Claims, 6 Drawing Sheets

REDUCED COMPLEXITY USER INTERFACE

BACKGROUND

Today's homes may have one or more means for receiving and displaying content via a single display device. For example, various electronic devices in the home may be networked together in such a way to provide a user with a means for entertainment. While many of today's homes may have one or more means for receiving, storing and/or displaying content, such as media content, there still exist user experience limitations for many of these devices. For example, today if a user wishes to access media content stored on the home network from his or her digital television (directly or via a set-top box), the user experience can be awkward in many instances.

Many digital televisions and other consumer electronics devices cannot facilitate the complex user interfaces of a personal computer, for example. Thus, there are limitations on how many files or objects of content can be easily manipulated via a user interface of a digital television or consumer electronics device in general.

DETAILED DESCRIPTION

Various embodiments may be directed to a reduced complexity user interface for use with a consumer electronics device. In an embodiment, a user interface module receives input from a 2-axis gesture or touch remote control or input device (e.g., gyroscope- or accelerometer-based free-form remote control) that uses only one button to facilitate the commands of select and unselect. Here, in embodiments, the user interface module is used to manipulate media files or objects into "piles". In embodiments, the manipulation of the piles may involve one or more of the creation of a pile, organization of a pile, reordering of a pile, adding to a pile, deleting from a pile, and so forth. The piles can be used to represent a play list, slideshow, etc., of media objects accessible via a consumer electronics device, for example. In embodiments, the user interface module facilitates a reduced complexity user interface that incorporates actions and graphical representations that relate to real world metaphors to take advantage of intuitive user knowledge. The actions and graphical representations create an animation of a pile. Other embodiments are described and claimed.

Various embodiments may include a reduced complexity user interface arranged to accept user input from a remote control. For example, the user interface module may be arranged to receive movement information representing pointing movements of the remote control. The remote control may be arranged to provide movement information as a user moves the remote control through space, such as moving the remote control to point to different objects displayed on a screen. In this manner, a user may enter information into a media device such as a television or set top box using the remote control as an "air" mouse or free-form pointing device. Alternatively, a user may provide movement information to the user interface module using other pointing devices implemented as either separate from the remote control or integrated with the remote control. The embodiments are not limited in this context.

Various embodiments may comprise one or more elements or components. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
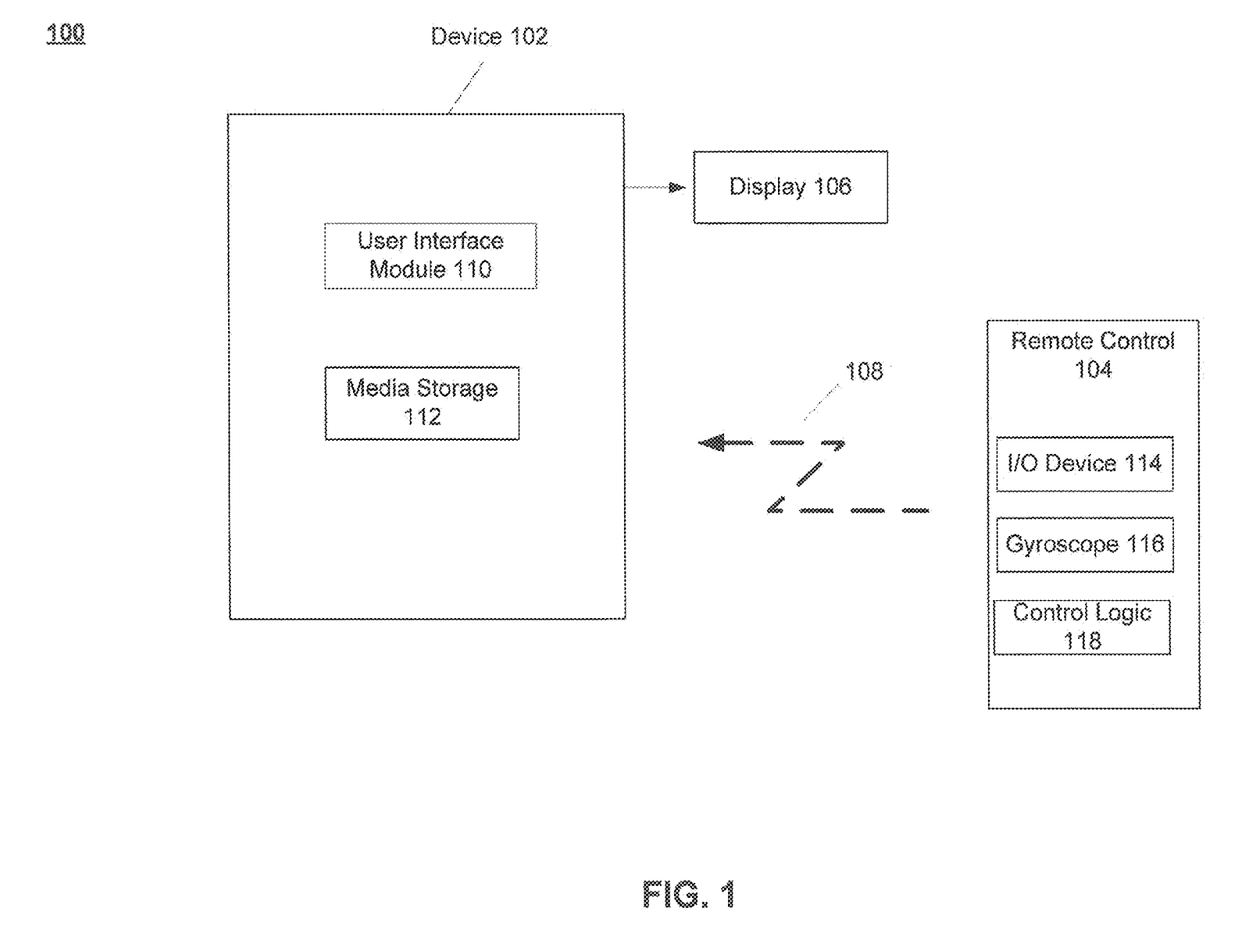
FIG. 1 illustrates one embodiment of a system.

FIG. 1 illustrates one embodiment of a system 100 in which embodiments of the invention may operate. Referring to FIG. 1, system 100 may include a device 102, a remote control 104, a display 106, and a communications media 108. Device 102 may include a user interface module 110 and media storage 112. Remote control 104 may include an input/output (I/O) device 114, a gyroscope 116 and control logic 118. Each of these elements is described next in more detail.

In one embodiment, for example, device 102 is a media processing system that may include various application programs, such as user interface module 110. For example, user interface module 110 may comprise a graphic user interface (GUI) to communicate information between a user and device 102. User interface module 110 may be used to facilitate embodiments of the reduced complexity user interface to create and manipulate piles of media objects, for example, via a networked digital home environment. Embodiments are not limited in this context.

As discussed above, many digital televisions and other consumer electronics devices cannot facilitate the complex user interfaces of a personal computer, for example. Thus, there are limitations on how many files or objects of content can be easily manipulated via a user interface of a digital television or consumer electronics device in general. Embodiments of the reduced complexity user interface may be used with a consumer electronics device and incorporate actions and graphical representations that relate to real world metaphors to take advantage of intuitive user knowledge. The actions and graphical representations create an animation of a pile when a pointer (on a user interface display) comes close to or within a boundary around the pile. The animation allows a user to easily manipulate the pile (e.g., create, organize, reorder, add to, delete from, and so forth). In embodiments, the use of animation helps to reduce the number of buttons, gestures and states used in user interfaces, which is advantageous in consumer electronics environments.

In an embodiment, user interface module 110 receives input from a 2-axis gesture or touch remote control 104 (e.g., gyroscope- or accelerometer-based free-form remote control) that uses only one button to facilitate the commands of select and unselect. Here, in embodiments, user interface module 110 is used to manipulate media objects into groupings or piles. The piles can be used to represent a play list, slideshow, etc., of media objects organized in some manner. In embodiments, the media objects in a pile may represent photographs, music, recordings, etc. Accordingly, embodiments of the invention allow a user to take an unorganized assortment of media (photographs, songs, etc.) and organize them into a few "piles" or groupings and then to create some sort of order within the piles themselves. Embodiments are not limited in this context.

Media objects may be stored in media storage 112, but embodiments are not limited to this. Media objects may be stored anywhere in a network, for example, that is accessible to device 102. Media storage 112 may store any type of objects (content or data). Examples of content may generally include any data or signals representing information meant for a user, such as media information, voice information, video information, audio information, image information, textual information, numerical information, alphanumeric symbols, graphics, and so forth. The embodiments are not limited in this context.

In embodiments, user interface module 110 may provide for the animation of one or more piles of objects on a user interface display (such as on display 106, for example) to allow a user to more easily manipulate the piles. Example user interface displays illustrating the operation of the animation of embodiments of the invention are illustrated in FIG. 2.

Figure 2:
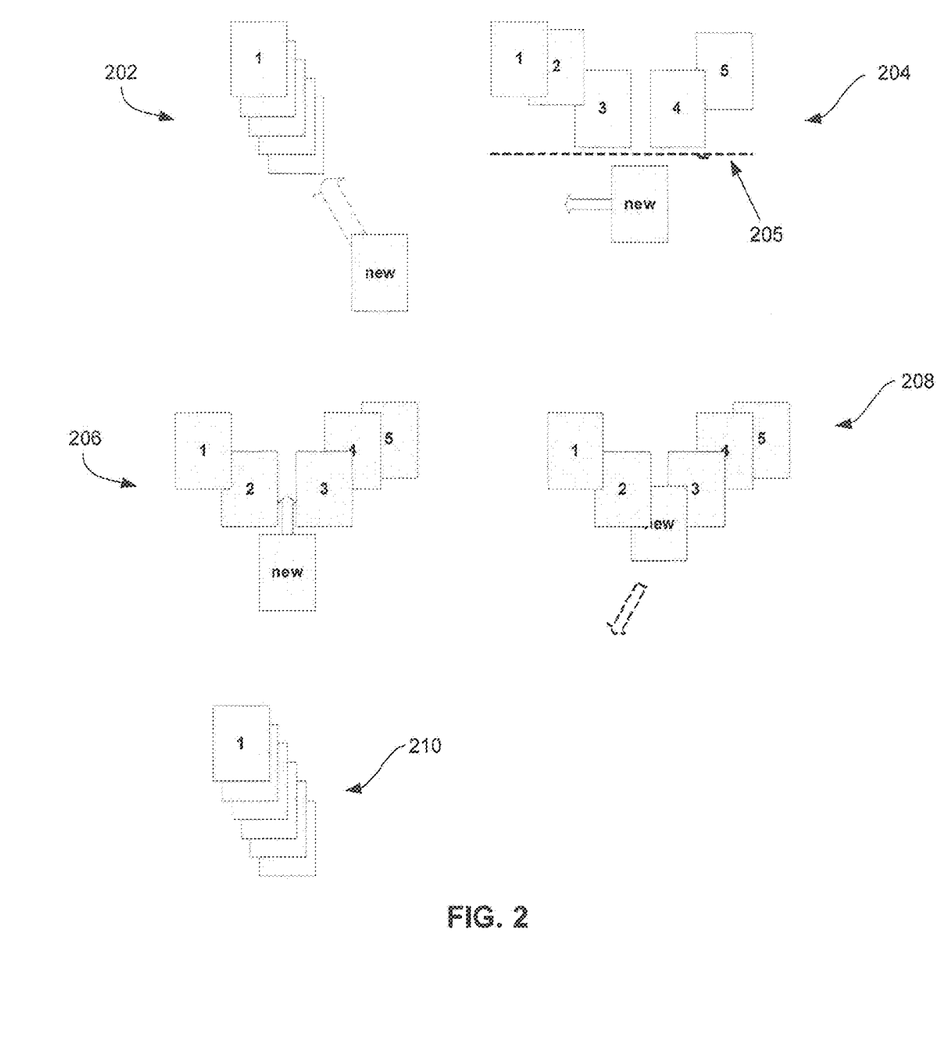
FIG. 2 illustrates one embodiment of a user interface display.

Referring to FIG. 2, a first user interface display 202 illustrates a new object that is to be added to an existing pile of objects. As shown in display 202, in embodiments, the pile is displayed in a contracted form with the objects overlapping each other in some manner. Here, a user might be able to determine the general number of objects included in the pile, but is likely not able to view any specific object (with the possible exception of the top or first object in the pile). Displaying the pile of objects in a contracted form on a user interface display allows a user to easily see that the pile of objects exists, but, at the same time, the pile does not take up too much space on a display. This is very useful when the pile of objects is large. This is also very useful with a device that might have a smaller display, such as on a mobile internet device (MID), for example. Assuming that the user wants to add a new object to the pile, a pointer or cursor may be positioned over a new object to be added to the pile via a remote control (such as remote control 104). The object may then be selected by activating or selecting a button on the remote control. A user is then able to move or drag the object towards the pile from any angle, as is illustrated in display 202. In embodiments, the reduced complexity user interface enables the user to manipulate a pile of objects via one selection button on the remote control and gestures to move one or more objects.

In embodiments, user interface display 204 illustrates the animation of the pile when the pointer approaches a boundary around the pile. In display 204, the boundary includes a horizontal line 205 positioned below the pile. Horizontal line 205 is not meant to limit embodiments of the invention. The boundary may include a square or circle or oval, for example, around the pile. The boundary may include one or more vertical lines positioned to the left and right of the pile. The boundary may include one or more horizontal lines positioned above and below the pile. Embodiments may provide for the boundary to be imaginary (not visible to the user). Other embodiments may provide some sort of visual indication of the boundary. Embodiments are not limited in this context.

As the pointer approaches the boundary (or horizontal line 205 in FIG. 2), the pile starts to animate to more easily allow the user to manipulate the pile. Here, for example, the pile expands in some manner to allow the user to more easily view objects in the pile (e.g., a side by side layout). In display 204, the pile is shown as expanding in a horizontal manner. This is not meant to limit embodiments of the invention. The pile may expand in any manner, including but not limited to, a horizontal manner, a vertical manner, a diagonal manner, a circular manner, and so forth.

In embodiments, as the pointer gets closer to two of the objects in the expanded pile, the two closest objects in the pile move closer to the pointer to visually indicate an insertion point into the pile. In embodiments, the insertion point is where the new object will be inserted into the pile if the new object was unselected at that point. As illustrated in display 204, the new object is closest to objects 3 and 4 and would be inserted between the two if the object is unselected at this point. In embodiments, the two closest objects are in full view while the remaining objects in the pile are overlapped in some manner. This may allow the best possible visual feedback, while not using up too much screen or display space for a large set. Due to limited screen space in the side by side layout, it may not be possible to show each object in whole or full visible resolution. Embodiments are not limited in this context.

To search the pile for a desired location to insert the new object, the user may move the pointer in a horizontal fashion along or around the boundary (e.g., horizontal line 205). Here, as the pointer moves along horizontal line 205, the two closest objects in the pile change with the pile acting in an animated fashion. This is illustrated via display 204 and 206. In display 204, the two closest objects are 3 and 4, as described above. As the user moves to the left along horizontal line 205, now objects 2 and 3 are the closest. Here, objects 3 and 4 move back to the expanded pile and objects 2 and 3 move closer to the pointer to visually indicate where the new object will insert into the pile. In an alternative embodiment, object 2 moves closer to the pointer and object 3 remains closer to the pointer while only object 4 moves back to the expanded pile. Embodiments are not limited in this context.

The new object may be inserted into the pile by unselecting or deactivating the button on the remote control. This is illustrated in user interface display 208. Once the pointer moves away from the boundary, the pile of objects contracts to its original form and size (or close to its original form and size), as is illustrated in user interface display 210.

In a similar way, a user may delete an object from the pile or reorder the objects in the pile. Here, as the pointer approaches the boundary around a pile, the pile expands, as described above. As the pointer moves along the boundary, the two closest objects in the pile move closer to the pointer. The user may search the objects in the pile by moving the pointer in a horizontal manner along the boundary. The user may select an object by positioning the pointer over the object and selecting the button on the remote control. The selected object can then be moved or dragged away from the pile if the object is to be deleted or moved along the boundary to select a new position in the pile for the object. Once the pointer moves away from the boundary, the pile contracts back to its original form and size. The animation illustrated in FIG. 2 is not meant to limit embodiments of the invention.

Referring back to FIG. 1, in various embodiments, user interface module 110 may be arranged to receive user input via remote control 104. Remote control 104 may be arranged to allow a user to perform pointing operations similar to a mouse or other pointing device using gyroscope 116, for example. User interface module 110 and remote control 104 allow a user to control a pointer on a display even when situated a relatively far distance from the display, such as normal viewing distance (e.g., 10 feet or more), and without the need for typical wired connections.

Remote control 104 may be arranged to control, manage or operate user interface module 110 by communicating control information using infrared (IR) or radio-frequency (RF) signals, for example. Various command codes may be assigned to one or more keys or buttons included with I/O device 114 for remote control 104. I/O device 114 may comprise various hardware or software buttons, switches, controls or toggles to accept user commands. In an embodiment, I/O device 114 may include only a selection button for selecting and unselecting an object on the user interface display. In another embodiment, I/O device 114 may include a touchpad. Here, a touchpad could be used to control the x/y movements for the pointer or cursor and then the gesture of lifting and tapping (e.g., one or more times) can imply a selection button select or unselect. In other embodiments, I/O device 114 may include one or more of a numeric keypad, arrow buttons, selection buttons, power buttons, mode buttons, selection buttons, menu buttons, and other controls needed to perform the normal control operations typically found in conventional remote controls. There are many different types of coding systems and command codes, and generally different manufacturers may use different command codes for controlling a given device.

In addition to I/O device 114, remote control 104 may also include elements that allow a user to enter information into a user interface at a distance by moving the remote control through the air in two or three dimensional space. For example, remote control 104 may include gyroscope 116 and control logic 118. In operation, a user may use remote control 104 to provide information for the user interface module 110 at a distance by moving remote control 104 through the air, similar to an air mouse. For example, a user may point remote control 104 to various objects displayed on display 106, for example. Gyroscope 116 may sense the movements of remote control 104, and send movement information representing the movements to a media processing node over communications media 108. User interface module 110 may receive the movement information, and move a pointer (e.g., mouse pointer) or cursor in accordance with the movement information on display 106. User interface module 110 may use the movement information and associated selection commands to perform any number of user defined operations for a networked digital home network, such as navigating option menus, selecting options, searching for media content, selecting media objects, and so forth.

In addition to operating as an air mouse or pointing device using gyroscope 116 and control logic 118, remote control 104 may use other techniques to control a pointer. For example, remote control 104 may include one or more accelerometers that may be used to help guide an object in focus or a pointer/cursor in a fully free-form pointing fashion. An example embodiment may include a MID that includes one or more accelerometers. Here, a touch screen of the MID may display a large (easy to see) button to allow the user to focus on a television screen, for example, at a distance. Embodiments are not limited in this context.

In other embodiments, remote control 104 may include an integrated pointing device. The pointing device may include various types of pointer controls, such as a track or roller ball, a pointing stick or nub, a joystick, arrow keys, direction keys, a touchpad, and so forth. Integrating a pointing device with remote control 104 may facilitate pointing operations for a user. Alternatively, a user may use a pointing device separate from remote control 104, such as various different types of mice or controllers. The pointing device may also be part of a device other than remote control 104, such as a wired or wireless keyboard. The particular implementation for the pointing device may vary as long as the pointing device provides movement information for the user interface module and allows a user to generate the movement information from a distance (e.g., normal viewing distance). The embodiments are not limited in this context.

Although embodiments of the invention described herein may be described as a home entertainment system or home network, this is not meant to limit the invention. Embodiments of the invention are applicable to any connected environment including, but not necessarily limited to, an office environment, research environment, hospital or institutional environment, and so forth.

In various embodiments, system 100 may be implemented as a wireless system, a wired system, or a combination of both. When implemented as a wireless system, system 100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Operations for the embodiments described herein may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments, however, are not limited to the elements or in the context shown or described in the figures.

Figure 3:
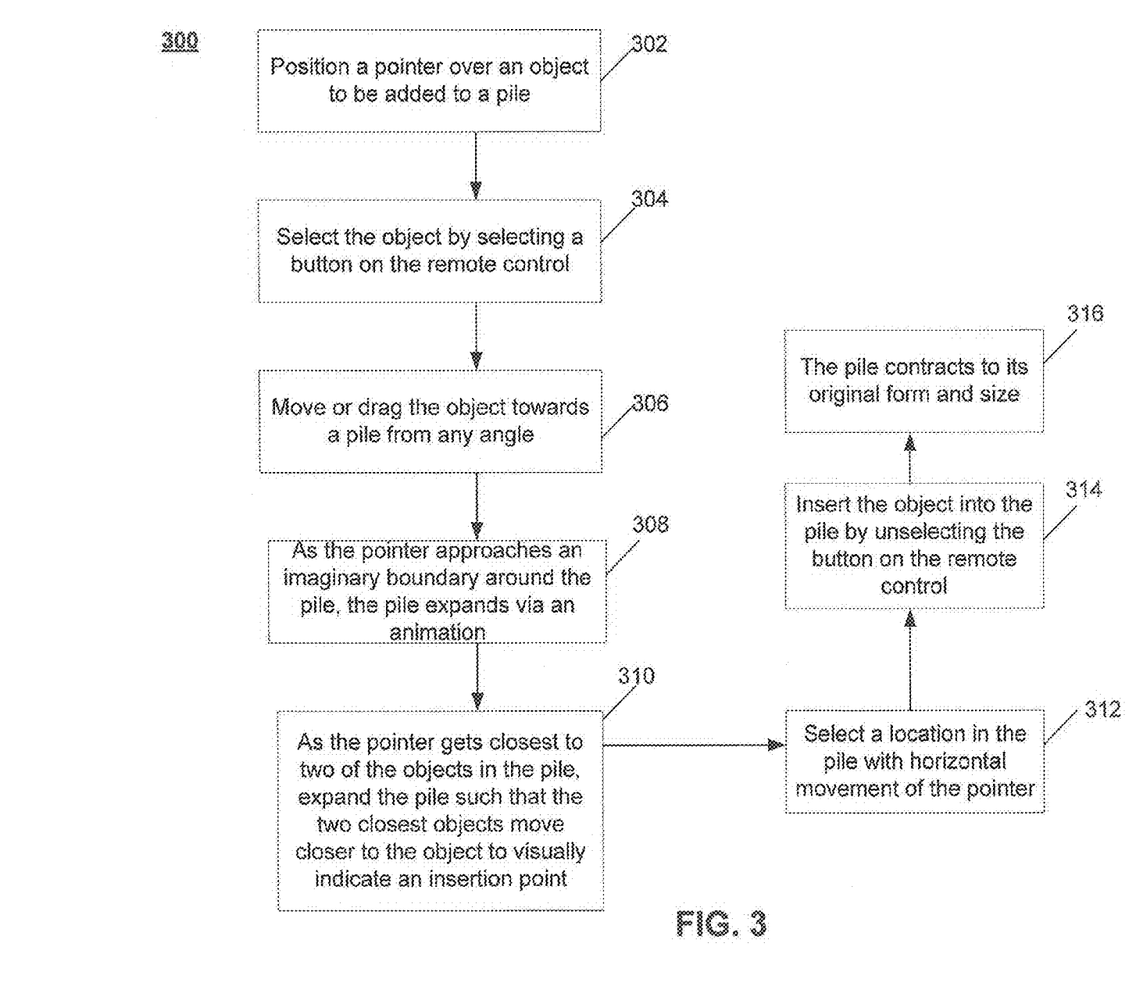
FIG. 3 illustrates one embodiment of a logic flow.

FIG. 3 illustrates one embodiment of a logic flow 300. Each of the blocks in logic flow 300 was described in more detail above and details of such will not be repeated. As shown in logic flow 300, a pointer or cursor is positioned over an object to be added to a pile (block 302). The object is selected by selecting a button on a remote control (block 304). The object is moved or dragged towards a pile from any angle (block 306). As the pointer approaches a boundary around the pile, the pile expands via an animation (block 308). As the pointer gets closest to two of the objects in the pile, the pile expands such that the two closest objects move closer to the object to visually indicate an insertion point into the pile (block 310). A location to insert the object in the pile is determined by moving the pointer in a horizontal manner along the boundary (which causes the pile to continue its animation) (block 312). The object may be inserted into the pile by unselecting the button on the remote control (block 314). Once the pointer moves away from the boundary, the pile contracts to its original form and size (block 316). The embodiments are not limited in this context.

Figure 4:
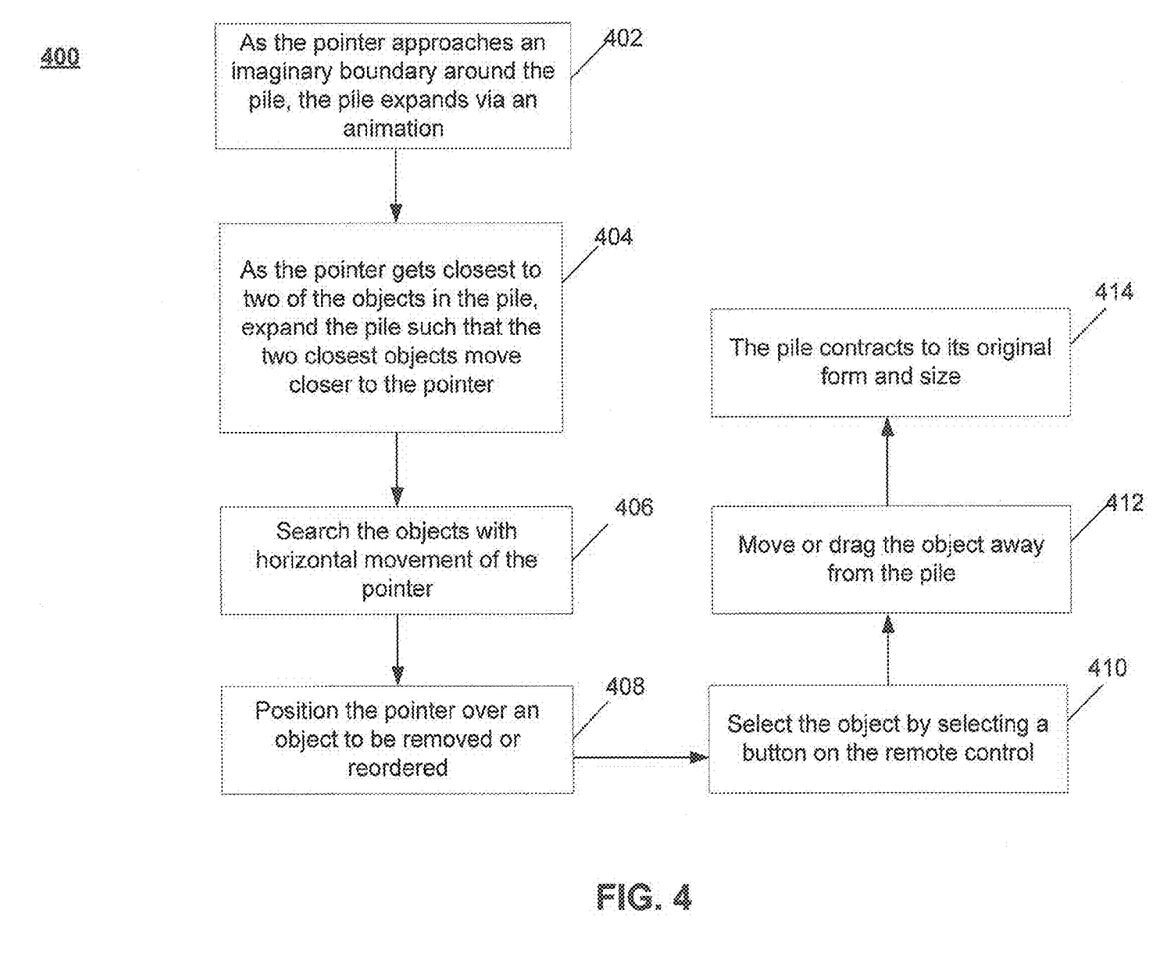
FIG. 4 illustrates one embodiment of a logic flow.

FIG. 4 illustrates one embodiment of a logic flow 400. Each of the blocks in logic flow 400 was described in more detail above and details of such will not be repeated. As shown in logic flow 400, as the pointer approaches the boundary around a pile, the pile expands (block 402). As the pointer moves along the boundary, the two closest objects in the pile move closer to the pointer (block 404). The user may search the objects in the pile by moving the pointer in a horizontal manner along the boundary (block 406). The user may select an object by positioning the pointer over the object (block 408) and selecting the button on the remote control (block 410). The selected object can then be moved or dragged away from the pile, if the object is to be deleted, or moved along the boundary to select a new position in the pile for the object (block 412). Once the pointer moves away from the boundary, the pile contracts back to its original form and size (block 414). Embodiments of the invention are not limited in this context.

Figure 5:
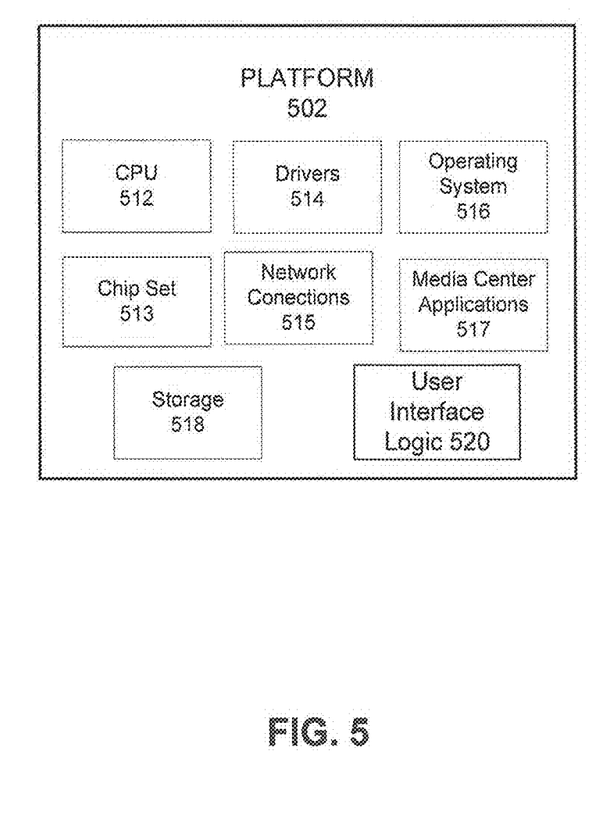
FIG. 5 illustrates one embodiment of a system.

FIG. 5 illustrates an embodiment of a platform 502 in which functionality of the present invention as described herein may be implemented. In one embodiment, platform 502 may comprise or may be implemented as a media platform 502 such as the Viiv™ media platform made by Intel® Corporation. In one embodiment, platform 502 may interact with a remote control (such as remote control 104 from FIG. 1).

In one embodiment, platform 502 may comprise a CPU 512, a chip set 513, one or more drivers 514, one or more network connections 515, an operating system 516, and/or one or more media center applications 517 comprising one or more software applications, for example. Platform 502 also may comprise storage 518 and reduced complexity user interface logic 520.

In one embodiment, CPU 512 may comprise one or more processors such as dual-core processors. Examples of dual-core processors include the Pentium® D processor and the Pentium® processor Extreme Edition both made by Intel® Corporation, which may be referred to as the Intel Core Duo® processors, for example.

In one embodiment, chip set 513 may comprise any one of or all of the Intel® 945 Express Chipset family, the Intel® 955X Express Chipset, Intel® 975X Express Chipset family, plus ICH7-DH or ICH7-MDH controller hubs, which all are made by Intel® Corporation.

In one embodiment, drivers 514 may comprise the Quick Resume Technology Drivers made by Intel® to enable users to instantly turn on and off platform 502 like a television with the touch of a button after initial boot-up, when enabled, for example. In addition, chip set 513 may comprise hardware and/or software support for 5.1 surround sound audio and/or high definition 7.1 surround sound audio, for example. Drivers 514 may include a graphics driver for integrated graphics platforms. In one embodiment, the graphics driver may comprise a peripheral component interconnect (PCI) Express graphics card.

In one embodiment, network connections 515 may comprise the PRO/1000 PM or PRO/100 VE/VM network connection, both made by Intel® Corporation.

In one embodiment, operating system 516 may comprise the Windows® XP Media Center made by Microsoft® Corporation. In other embodiments, operating system 516 may comprise Linux®, as well as other types of operating systems. In one embodiment, one or more media center applications 517 may comprise a media shell to enable users to interact with a remote control device from a distance of about 10-feet away from platform 502 or a display device, for example. In one embodiment, the media shell may be referred to as a "10-feet user interface," for example. In addition, one or more media center applications 517 may comprise the Quick Resume Technology made by Intel®, which allows instant on/off functionality and may allow platform 502 to stream content to media adaptors when the platform is turned "off."

In one embodiment, storage 518 may comprise the Matrix Storage technology made by Intel® to increase the storage performance enhanced protection for valuable digital media when multiple hard drives are included. In embodiments, reduced complexity user interface logic 520 is used to enable the functionality of embodiments of the invention as described herein.

Platform 502 may establish one or more logical or physical channels to communicate information. The information may include media information and control information. Media information may refer to any data representing content meant for a user. Control information may refer to any data representing commands, instructions or control words meant for an automated system. For example, control information may be used to route media information through a system, or instruct a node to process the media information in a predetermined manner. In embodiments, device platform 502 may be implemented as part of a wired communication system, a wireless communication system, or a combination of both. The embodiments, however, are not limited to the elements or in the context shown or described in FIG. 5.

Figure 6:
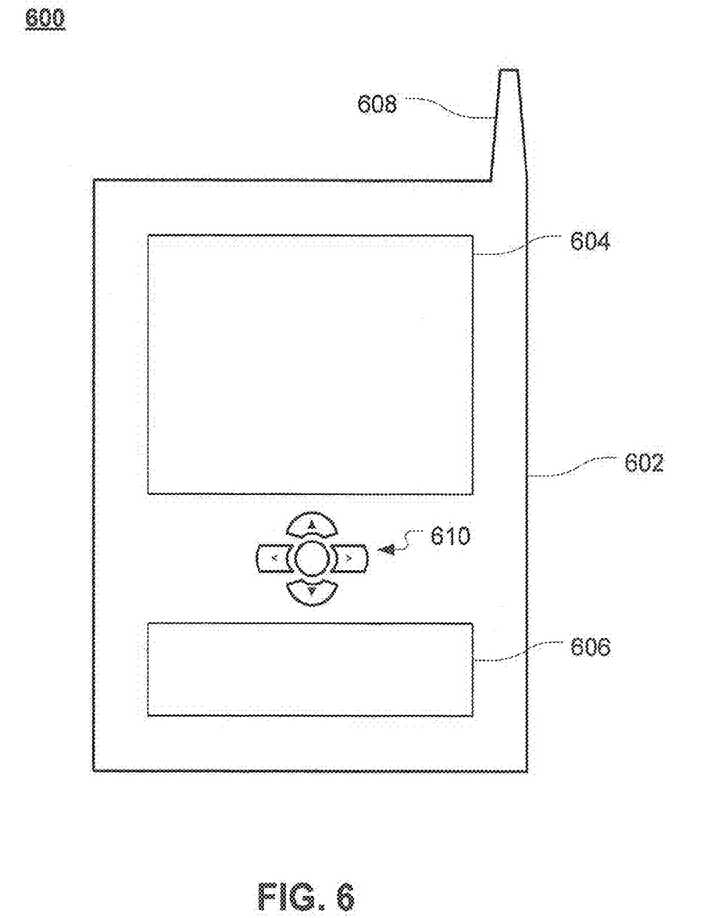
FIG. 6 illustrates one embodiment of a device.

FIG. 6 illustrates one embodiment of a device 600 in which functionality of the present invention as described herein may be implemented. In one embodiment, for example, device 600 may comprise a communication system. In various embodiments, device 600 may comprise a processing system, computing system, mobile computing system, mobile computing device, mobile wireless device, computer, computer platform, computer system, computer sub-system, server, workstation, terminal, personal computer (PC), laptop computer, ultra-laptop computer, portable computer, handheld computer, personal digital assistant (PDA), cellular telephone, combination cellular telephone/PDA, smart phone, pager, one-way pager, two-way pager, messaging device, blackberry, and so forth. The embodiments are not limited in this context.

In embodiments, device 600 may be implemented as part of a wired communication system, a wireless communication system, or a combination of both. In one embodiment, for example, device 600 may be implemented as a mobile computing device having wireless capabilities. A mobile computing device may refer to any device having a processing system and a mobile power source or supply, such as one or more batteries, for example.

Examples of a mobile computing device may include a laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, mobile internet device (MID), and so forth.

In one embodiment, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may comprise a housing 602, a display 604, an input/output (I/O) device 606, and an antenna 608. Device 600 also may comprise a five-way navigation button 610. I/O device 606 may comprise any suitable I/O device for entering information into a mobile computing device. Examples for I/O device 606 may include an alphanumeric keyboard, a numeric keypad, a touch pad, input keys, buttons, switches, rocker switches, a speaker, voice recognition device and software, and so forth. Information also may be entered into device 600 by way of microphone. Such information may be digitized by a voice recognition device. Display 604 may comprise any suitable display unit for displaying information appropriate for a mobile computing device. Device 600 may incorporate or have access to reduced complexity user interface logic to enable the functionality of the embodiments of the invention described herein. The embodiments, however, are not limited to the elements or in the context shown or described in FIG. 6.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a user interface module configured to operate via at least one electronic processing system and to cause an animation of a pile of objects on a user interface display, wherein the pile of objects is configured to expand from a contracted form when a pointer approaches a boundary of the pile on the user interface display, wherein the boundary is invisible to a user, and wherein the user interface module is configured to render a pre-insertion animation that, as the pointer moves along the boundary:
dynamically determines two closest objects in the pile of objects that correspond with the pointer on the user interface display;
moves the two closest objects closer to the pointer; and
presents the two closest objects in non-obstructed full view to the user optimizing visual feedback in limited display space to visually indicate an insertion point into the pile between the two closest objects.

2. The apparatus of claim 1, wherein the insertion point is configured to represent where a new object will be inserted into the pile.

3. The apparatus of claim 1, wherein the pile of objects may be searched by moving the pointer along the boundary.

4. The apparatus of claim 1, wherein the pile of objects is configured to expand to allow the user to more easily view the objects in the pile.

5. The apparatus of claim 4, wherein the pile of objects is configured to expand to allow the user to extract an object from the pile or insert the object into the pile.

6. The apparatus of claim 1, wherein the pile of objects is configured to return to the contracted form when the pointer moves away from the boundary.

7. The apparatus of claim 1, wherein the user interface module is configured to receive movement information from a remote control, and to move the pointer in response to the movement information, wherein the remote control is a free-form pointing device.

8. A method, comprising:
   causing an animation of a pile of objects on a user interface display, the animation comprising:
      expanding the pile of objects from a contracted form when a pointer approaches a boundary of the pile on the user interface display, wherein the boundary is invisible to a user; and
      as the pointer moves along the boundary,
         dynamically determining two closest objects in the pile of objects that correspond with the pointer on the user interface display;
         moving the two closest objects closer to the pointer; and
         presenting the two closest objects in non-obstructed full view to the user optimizing visual feedback in limited display space to visually indicate an insertion point into the pile between the two closest objects.

9. The method of claim 8, wherein the insertion point is configured to represent where a new object will be inserted into the pile.

10. The method of claim 8, the animation further comprising allowing the user to search the pile of objects by moving the pointer along the boundary.

11. The method of claim 8, wherein the pile of objects is configured to expand to allow the user to more easily view the objects in the pile.

12. The method of claim 11, wherein the pile of objects is configured to expand to allow the user to extract an object from the pile or insert the object into the pile.

13. The method of claim 8, the animation further comprising returning the pile of objects to the contracted form when the pointer moves away from the boundary.

14. The method of claim 8, the animation further comprising:
   receiving movement information from a remote control; and
   moving the pointer in response to the movement information, wherein the remote control is a free-form pointing device.

15. A non-transitory machine-readable medium storing instructions which, when executed by a processing system, cause the processing system to perform instructions for:
   causing an animation of a pile of objects on a user interface display, the animation comprising:
      expanding the pile of objects from a contracted form when a pointer approaches a boundary of the pile on the user interface display, wherein the boundary is invisible to a user; and
      as the pointer moves along the boundary,
         dynamically determining two closest objects in the pile of objects that correspond with the pointer on the user interface display;
         moving the two closest objects closer to the pointer; and
         presenting the two closest objects in non-obstructed full view to the user optimizing visual feedback in limited display space to visually indicate an insertion point into the pile between the two closest objects.

16. The non-transitory machine-readable medium of claim 15, wherein the insertion point is configured to represent where a new object will be inserted into the pile.

17. The non-transitory machine-readable medium of claim 15, the animation further comprising allowing the user to search the pile of objects by moving the pointer along the boundary.

18. The non-transitory machine-readable medium of claim 15, wherein the pile of objects is configured to expand to allow the user to more easily view the objects in the pile.

19. The non-transitory machine-readable medium of claim 18, wherein the pile of objects is configured to expand to allow the user to extract an object from the pile or insert the object into the pile.

20. The non-transitory machine-readable medium of claim 15, the animation further comprising returning the pile of objects to the contracted form when the pointer moves away from the boundary.

* * * * *